United States Patent
Jones

(10) Patent No.: US 9,165,339 B2
(45) Date of Patent: Oct. 20, 2015

(54) BLENDING MAP DATA WITH ADDITIONAL IMAGERY

(71) Applicant: Google Inc., Mountain View, CA (US)

(72) Inventor: Jonah Jones, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/087,923

(22) Filed: Nov. 22, 2013

(65) Prior Publication Data
US 2015/0242992 A1    Aug. 27, 2015

(51) Int. Cl.
*G09G 5/00*    (2006.01)
*G06T 3/40*    (2006.01)

(52) U.S. Cl.
CPC ........................ *G06T 3/40* (2013.01)

(58) Field of Classification Search
None
See application file for complete search history.

(56) References Cited

U.S. PATENT DOCUMENTS

| | | | |
|---|---|---|---|
| 5,625,765 A | 4/1997 | Ellenby et al. | |
| 5,926,116 A | 7/1999 | Kitano et al. | |
| 6,377,210 B1 | 4/2002 | Moore | |
| 6,396,507 B1 | 5/2002 | Kaizuka et al. | |
| 7,170,632 B1 | 1/2007 | Kinjo | |
| 8,274,571 B2 | 9/2012 | Zhu | |
| 2001/0014185 A1 | 8/2001 | Chitradon et al. | |
| 2006/0209089 A1 | 9/2006 | Date | |
| 2007/0162942 A1 | 7/2007 | Hamynen et al. | |
| 2007/0165103 A1 | 7/2007 | Arima et al. | |
| 2007/0210937 A1 | 9/2007 | Smith et al. | |
| 2007/0258642 A1 | 11/2007 | Thota | |
| 2008/0147730 A1 | 6/2008 | Lee et al. | |
| 2008/0285890 A1 | 11/2008 | Han et al. | |
| 2009/0073191 A1* | 3/2009 | Smith et al. | 345/629 |
| 2010/0202700 A1* | 8/2010 | Rezazadeh et al. | 382/199 |
| 2010/0295971 A1* | 11/2010 | Zhu | 348/240.99 |
| 2011/0316884 A1* | 12/2011 | Giambalvo et al. | 345/660 |
| 2012/0133664 A1* | 5/2012 | Zhu et al. | 345/582 |
| 2012/0188246 A1* | 7/2012 | Cheung et al. | 345/428 |
| 2012/0206469 A1* | 8/2012 | Hulubei et al. | 345/581 |
| 2014/0140575 A1* | 5/2014 | Wolf | 382/103 |

OTHER PUBLICATIONS

Azuma, Ronald, "A Survey of Augmented Reality," In Presence: Teleoperators and Virtual Environments, vol. 6, Issue 4, Aug. 1997, pp. 355-385.
European Search Report, 10778130.4, dated Oct. 10, 2012.
Hansen, Arne Enger "Designing Mobile Tools for Flora Mapping" PhD thesis, Ostfold University College (Norway), Published May 28, 2007 (online). [retrieved on Feb. 7, 2010]. Retrieved from the Internet <URL:http://mcobapp.hiof.no/wp-content/uploads/hansen07dmt.pdf> entire document.

(Continued)

*Primary Examiner* — Stephen R Koziol
*Assistant Examiner* — Khoa Vu
(74) *Attorney, Agent, or Firm* — Lerner, David, Littenberg, Krumholz & Mentlik, LLP

(57) ABSTRACT

In one aspect, a map is provided for display by one or more computing devices. The map includes one or more polygons. The one or more computing devices receive a zoom request for viewing the map. The one or more computing devices then determines whether a visual threshold has been reached based at least in part on the zoom request. When the visual threshold has been reached, the one or more computing devices identify a polygon of the one or more polygons. The one or more computing devices then provide for display alternate imagery corresponding to the polygon on the map.

19 Claims, 10 Drawing Sheets

(56) References Cited

OTHER PUBLICATIONS

International Search Report and Written Opinion, PCT/US10/34654, dated Jul. 13, 2010.
Noah Snavely, Steven M. Seitz and Richard Szeliski, Modeling the World From Internet Photo Collections, Oct. 31, 2007, 22 pages.
Noah Snavely, Steven M. Seitz, Richard Szeliski, "Photo tourism: Exploring photo collections in 3D," ACM Transactions on Graphics (SIGGRAPH Proceedings), 25(3), 2006, 835-846. [pdf] pbibtex].
Website: Photo Tourism, url: phototour.cs.washington.edu [Retrieved from Web on Jan. 18, 2012].
Abowd, Gregory D. et al., "Cyberguide: A Mobile Context-Aware Tour Guide," Wireless Networks, vol. 3, 1997, pp. 421-433.

* cited by examiner

BLENDING MAP DATA WITH ADDITIONAL IMAGERY

BACKGROUND

Various systems allow users to view maps of different locations on a display of a computing device. In addition, many of these systems allow users to manipulate how the map is viewed. As an example, some map systems provide tools that allow a user to "move" a map, such as by selecting and dragging the map or selecting a point and re-rendering the map centered at the selected point on the display. Some systems may also allow a user to zoom in or out on the map. In this regard, as the zoom factor of a map becomes larger, features in the map may appear to move farther apart. For instance, roads and other map features mays appear farther apart. If the map is vector-based, as opposed to tile or other image-based, the quality of the rendered image may never actually degrade. In this regard, the actual zoom possible in a vector based map may be considered infinite. However, eventually, there may be very little detail available to render on the display, potentially making the map less interesting to the user.

SUMMARY

Aspects of the disclosure provide a computer-implemented method. The method includes providing for display, by one or more computing devices, a map including one or more polygons; receiving, by the one or more computing devices, a zoom request for viewing the map; determining, by the one or more computing devices, whether a map zoom threshold has been reached based at least in part on the zoom request; when the map zoom threshold has been reached, identifying, by the one or more computing devices, a polygon of the one or more polygons; and providing for display, by the one or more computing devices, alternate imagery corresponding to the polygon on the map.

In one example, identifying the polygon is based at least in part on a user selection action. In another example, identifying the polygon is based at least in part on a number of pixels associated with the polygon. In another example, identifying the polygon is based at least in part on map information describing a feature type associated with the polygon. In another example, the alternate imagery includes a satellite image. In another example, displaying the imagery further includes overlaying the imagery on the polygon using a predetermined overlay value. In another example, the method also includes identifying the imagery by comparing the geographic locations of the vertices of the polygon to geographic location information associated with the imagery. In another example, displaying the imagery further includes giving the imagery a fine edge effect. In another example, displaying the imagery further includes giving the imagery a dry brush effect.

Another aspect of the disclosure provides a method. The method includes receiving, by one or more computing devices, a request for a map; providing for display, by the one or more computing devices, the map including one or more polygons; receiving, by the one or more computing devices, a request to change a view of the map; determining, by the one or more computing devices, whether a visual threshold of the map has been reached based at least in part on the request to change the view; when the visual threshold of the map has been reached, identifying, by the one or more computing devices, a polygon of the one or more polygons; and providing for display, by the one or more computing devices, alternate imagery corresponding to the polygon on the map.

In one example, the visual threshold is a minimum number of vectors rendered in the map. In another example, the visual threshold is a particular zoom level of the map. In another example, the visual threshold is based on a polygon's characteristics relative to the displayed map. In another example, identifying the polygon is based at least in part on a threshold of the polygon's characteristics relative to the displayed map. In another example, identifying the polygon is further based on a user selection action identifying the polygon. In another example, identifying the polygon is further based on map information describing a feature type associated with the polygon.

A further aspect of the disclosure provides a system. The system includes one or more computing devices. The one or more computing devices are configured to receive a request for a map; provide for display the map including one or more polygons; receive a request to change a view of the map; determine whether a visual threshold of the map has been reached based at least in part on the request to change the view; when the visual threshold of the map has been reached, identify a polygon of the one or more polygons; and providing for display, by the one or more computing devices, alternate imagery corresponding to the polygon on the map.

In one example, the one or more computing devices are also configured to identify the polygon based at least in part on a threshold of the polygon's characteristics relative to the displayed map. In another example, the one or more computing devices are also configured to identify the polygon further based on a user selection action identifying the polygon. In another example, the one or more computing devices are also configured to identify the polygon further based on map information describing a feature type associated with the polygon.

DETAILED DESCRIPTION

Overview

Figure 1:
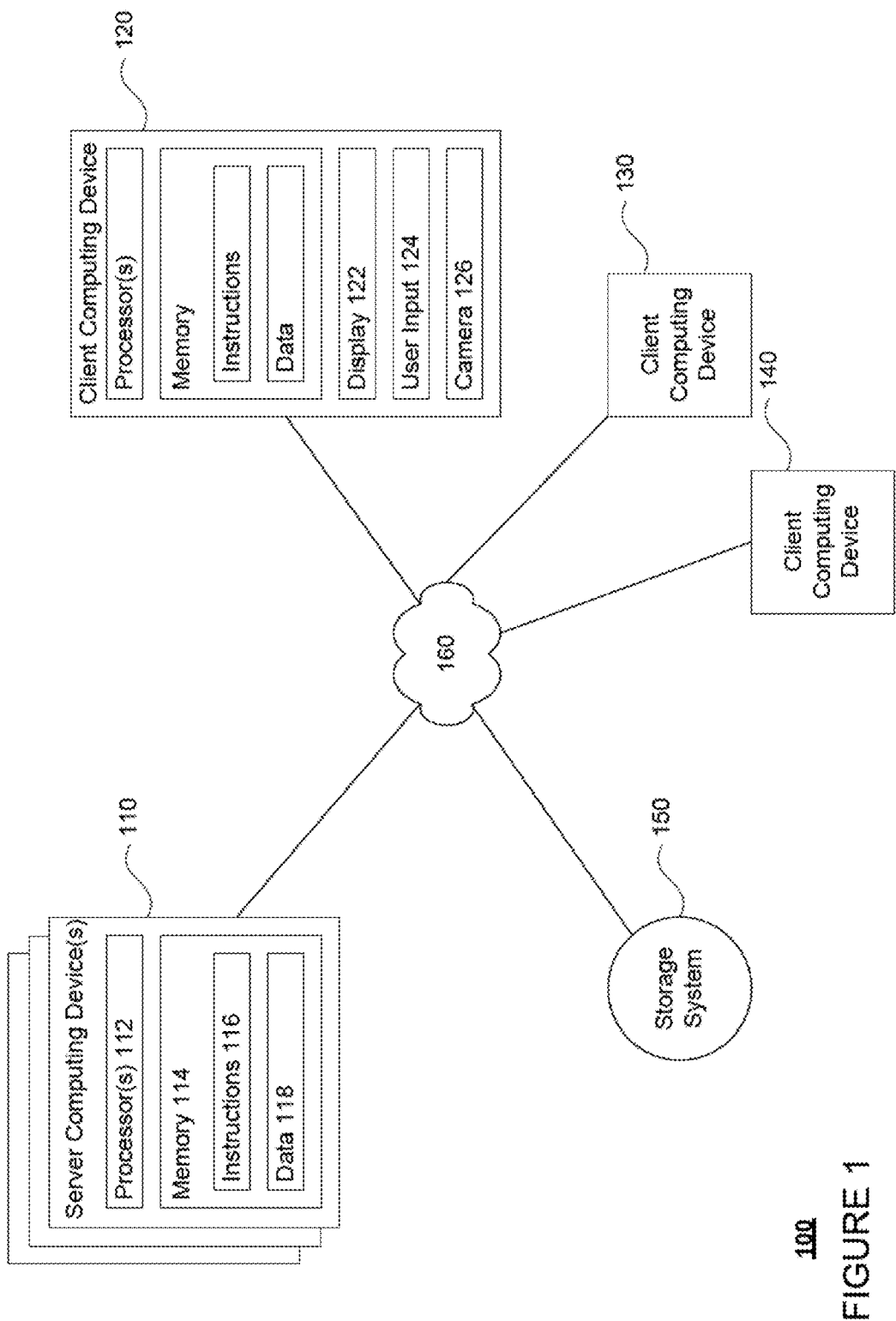
FIG. 1 is a functional diagram of an example system in accordance with aspects of the disclosure.

The technology relates generally to providing users with useful and interesting map information. As noted above, when a user views a vector-based map on a client device, as the user zooms into the map, the density of the map data will become lower and lower. In other words, roads will be shown farther apart and the map may become less interesting. As discussed in more detail below, rather than continuing with an infinite zoom, once the user reaches a particular zoom level, additional imagery, such as satellite imagery, may be blended with the map. In this regard, as the user zooms into the map, rather than potentially becoming less interesting, the user may actually view more detail about the area at which he or she is focusing.

In one example, in response to the user's request the user's client device may retrieve map information from a remote location, such as a server computer, or from local storage. The client device may then render a display of a map including a plurality of roads. As the user manipulates the map, such as by zooming in, if the map is a vector-based map, the displayed map may never become blurry.

However, the displayed map may run out of interesting details. In other words, only a few roads or other features may be visible on the display. This may be the result of reaching some visual threshold, such as a particular zoom level. This particular zoom level may be a fixed level or may be dictated by some other signal such as a number of vectors rendered on the user's display.

Once this visual threshold has been reached, all or a portion of the displayed map may be replaced or overlaid with satellite imagery. In this regard, the user may experience the feeling of automatically switching from a map mode to a satellite image mode. In the example of an overlay, a fixed value, such as a 20% or 50% overlay may be used. Thus, because the user can view both satellite and map information, it is not necessarily a total mode switch.

As noted above, in some examples, only a portion of the map may be replaced by other imagery. For example, rather than displaying additional imagery representing the entire area of the map, only specific polygons, such as those bounded by road vectors, may be replaced by other imagery as shown in.

The polygons to be replaced may be identified in various ways. In one example, the polygons may be identified based on the feature types that they represent. In this example, the information used to render the map may include tags or labels identifying types of features. These tags or labels may then be used to identify polygons or areas to be replaced with other imagery. For example, all parks or public areas may be automatically replaced, overlaid, etc. once the visual threshold is reached.

Because both the map information and the additional imagery are geolocated, the map location of the polygon may be used to identify a corresponding area of additional imagery. In addition, the zoom level of the displayed map as well as the area (size) of the polygon may also be used to determine the proper size of the additional imagery for display.

In another example, the polygons may be identified based on a user action. For instance, a user may select an area of a polygon when the threshold has been reached. This selection action may cause the client device to display additional imagery for the selected polygon. This may also be combined with the example above such that the user may only select and receive additional imagery for specific areas such as parks or other public areas. In this regard, selecting a non-public area would not provide the user with other imagery.

In yet another example, a polygon may be identified based on its characteristics relative to the displayed map. For example, if a polygon occupies more than a threshold number of pixels or portion of a displayed map other imagery may be displayed. In other words, if the polygon is relatively large enough and does not contain any other map features, the polygon may be replaced, overlaid, etc. with other imagery. Again this may be combined with one or both of the feature type and user action examples above.

The additional imagery may be displayed in various ways. As noted above, the additional imagery may simply replace, overlay, a corresponding portion of the map. In addition, the additional imagery may be given various effects to improve the user's map viewing experience. For example, the effects may include a straightforward blend, a dry brush effect, or a fine edge blend. The fine edge blend may give the map a cartoonish style, such that the user has the impression that the additional imagery was "drawn" as part of the map.

The replacing, overlaying, blending, etc. may be performed locally at the user's client device. Alternatively, these may occur at a remote location, such as a server that provides the map information to the client device. In this regard, if there is a user action, this information may be sent to the server which may provide appropriate map information and additional imagery to the client device in response.

Example Systems

Figure 2:
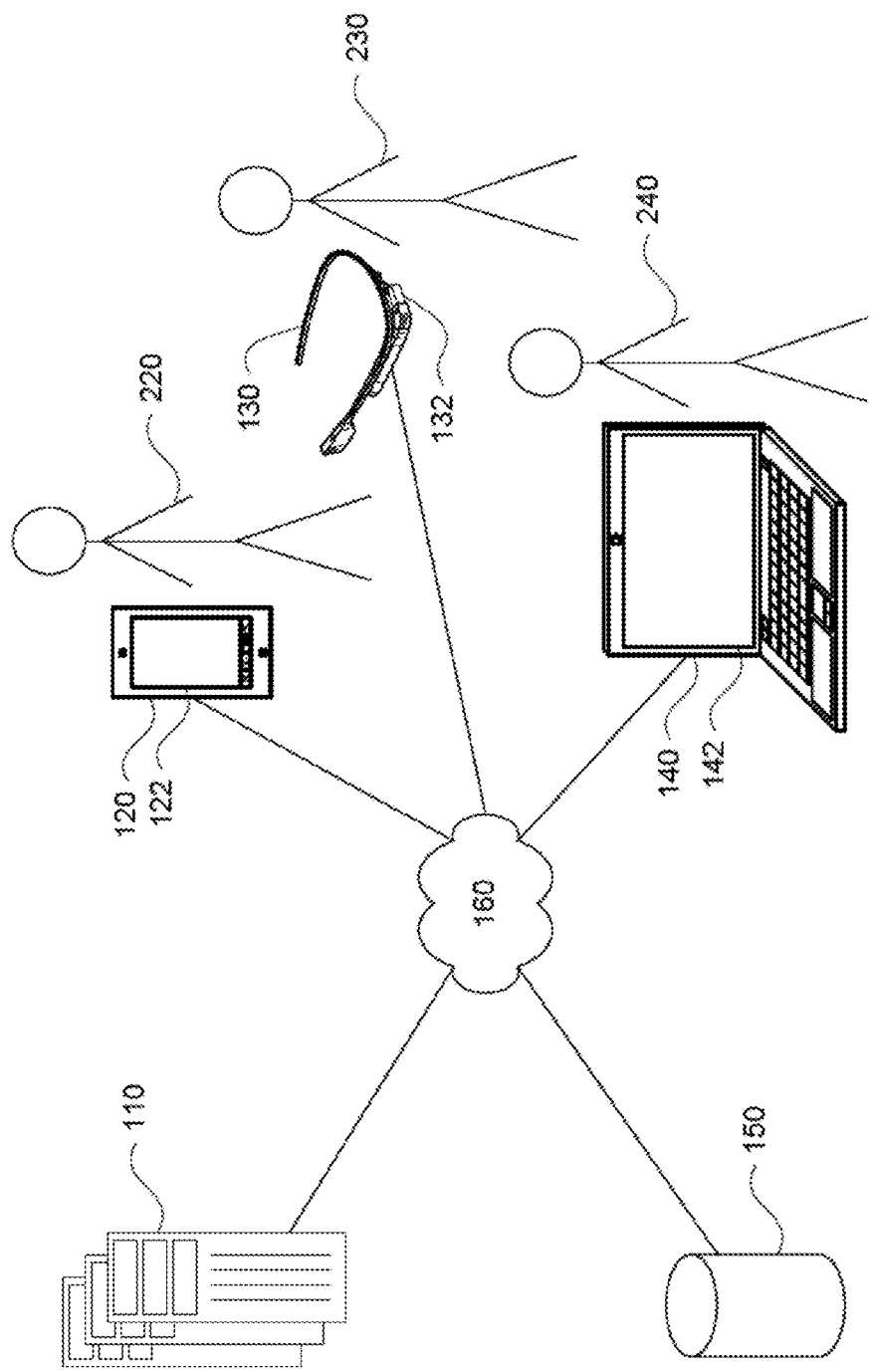
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Computing device 110 can contain one or more processors 112, memory 114 and other components typically present in general purpose computing devices. Memory 114 of computing device 110 can store information accessible by processor 112, including instructions 116 that can be executed by the processor 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

The computing devices 110 can be at various nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may include one or more web servers that are capable of communicating with storage system 150 as well as computing devices 120, 130, and 140 via the network. For example, server computing devices 110 may use network 160 to transmit and present information to a user, such as user 220, 250, or 250, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 125 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store map information as well as imagery data. For example, the map information may include vector data used to draw individual map features. The imagery data may include any type of images that can be used to replace, overlay or augment the map information. As an example, this imagery data can include satellite images, aerial images, or other such images.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to or incorporated into any of the computing devices 110-140 (not shown).

Example Methods

A user may request to view a map on his or her client device. This request may include information that can be used to identify a relevant portion of a map, such as an address, location coordinates, landmark or business name, an image of a location, or any other such information. As an example, client device 120 may send a request to one or more of server computing devices 110 for a map of a particular location, such as Lake Northam. Server computing devices 110 may respond by retrieving map information from storage system 150 and sending it to the client computing device 120. Alternatively, client computing device 120 may retrieve the map from local storage.

Figure 3:
FIG. 3 is an example screen shot in accordance with aspects of the disclosure.

The map or map information may thus be provided to the client device for display to the user. As noted above, if the map is a vector-based map, the provided map information may include a plurality of vectors that can be used by the client device to render an image of a map. FIG. 3 is an example screen shot 300 of a map 310 which includes Lake Northam. The example screen shot 300 was generated from vector data. In this example, vectors were used to render the features of highways 312 and 314, road 316, and path 318.

The user may manipulate the map in various ways. For example, the user may pan or zoom into the image as with typical map products. Because the example screen shot 300 was generated using vector data, when the user zooms into the map 310, the density of the map data will become lower and lower. As noted above, highways 312 and 314, road 316, and path 318 will become farther apart. Some of these features may no longer be shown on the map as they move outside of the rendered area. Thus, the map may become less interesting. Eventually, only a few roads or other features may be visible on the display.

Eventually, the user may manipulate the map such that it reaches some visual threshold. As an example, the visual threshold may be a particular zoom level. This particular zoom level, or threshold, may be a fixed level (e.g., 1 pixel represents 5, 50, 100 meters, etc.), or may be dictated by some other signal such as a number of vectors rendered on the user's display (e.g., 50, 100, 500, etc.).

Once this visual threshold has been reached, all or a portion of the displayed map may be replaced or overlaid with additional imagery. Rather than becoming less interesting as the user zooms into the map, more details are automatically provided via the additional imagery. As an example, a portion of the map may be replaced or overlaid with additional imagery, such as satellite or aerial imagery, by the client computing device. In this regard, the user may experience the feeling of automatically switching from a map mode to a satellite image mode. However, because the user can view both satellite and map information, there is less of a jarring effect with the change, and the satellite imagery is given context.

Figure 4:
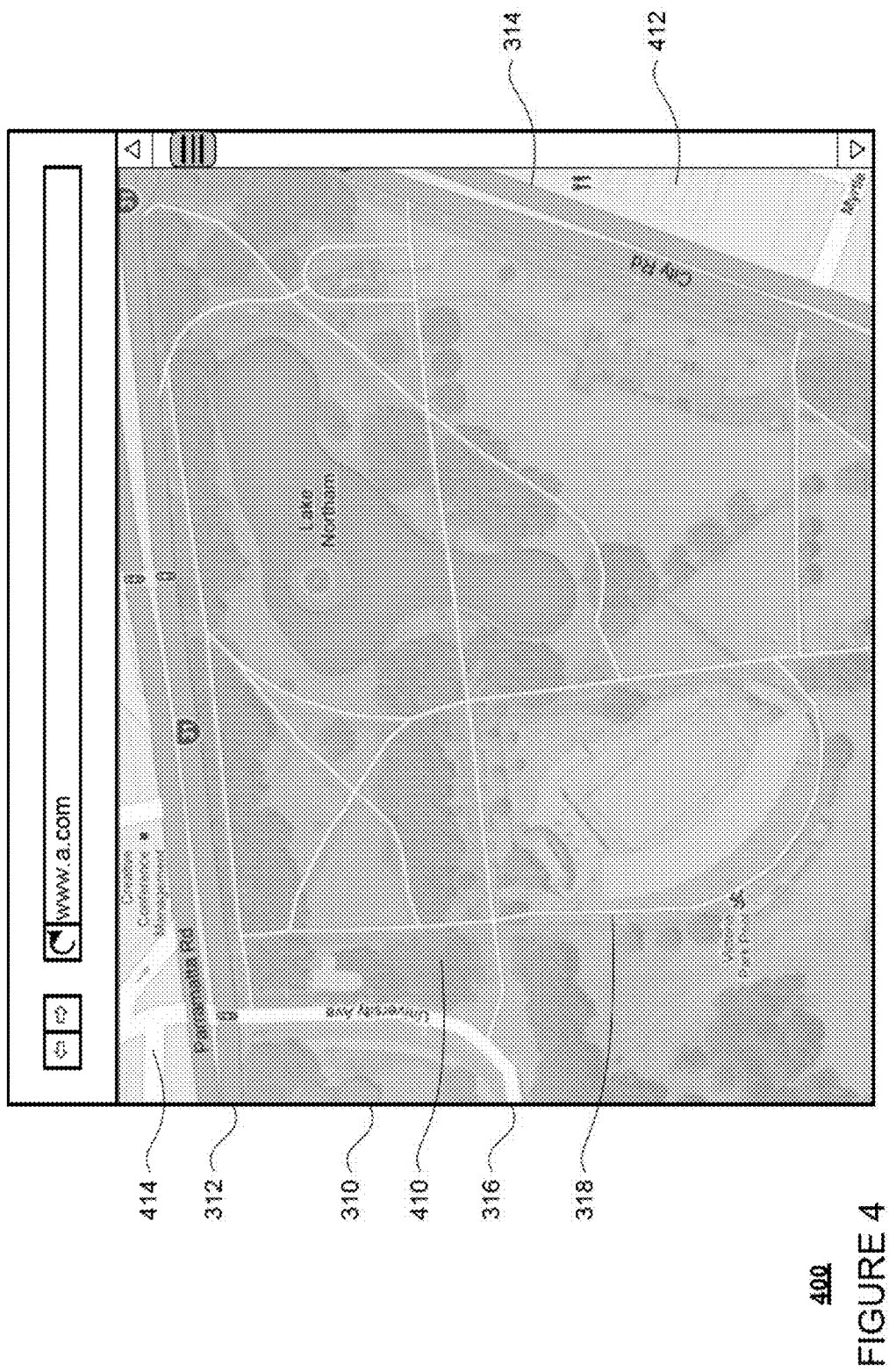
FIG. 4 is another example screen shot in accordance with aspects of the disclosure.

When the additional imagery is overlaid on the map, a fixed overlay value may be used. Example overlay values may include 5%, 20%, 50%, and so on until 100%. FIG. 4 is an example screen shot 400 of displaying satellite imagery 410 with the map 310 using a 50% overlay.

As noted above, in some examples, only a portion of the map may be replaced by additional imagery. For example, rather than displaying satellite imagery representing the entire area of the map, only specific polygons, such as those bounded by road vectors may be replaced by additional imagery. Returning to example screen shot 400 of FIG. 4, although a portion of map 310 is shown as overlaid with satellite imagery 410, other areas such as area 412 and area 414 are not overlaid with satellite imagery. In this example, the polygon bounded by highways 312 and 314 is not completely within the viewable area of map, although this need not be so.

Figure 5A:
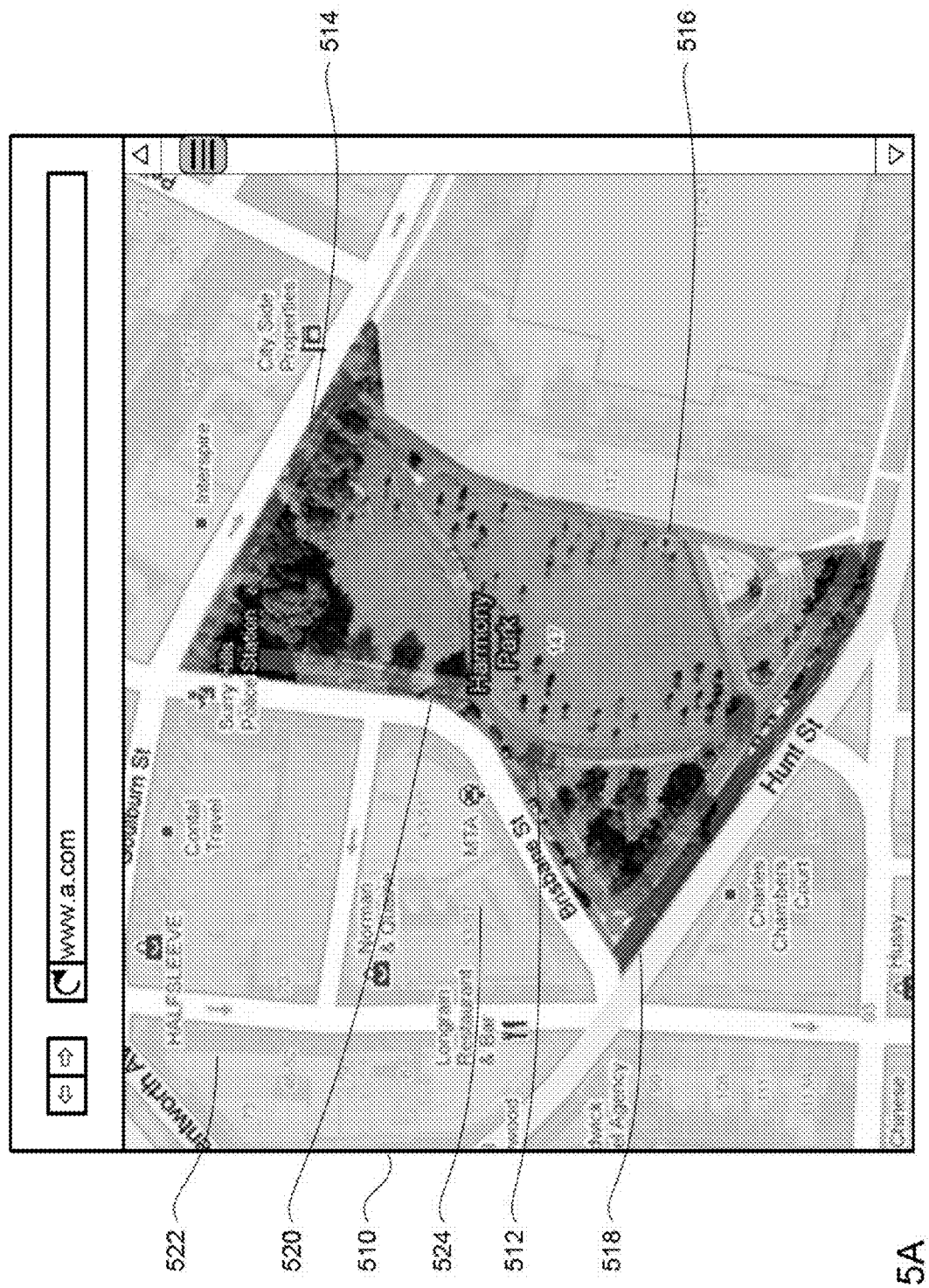
FIGS. 5A and 5B are further example screen shots in accordance with aspects of the disclosure.

Example screen shot 500 of FIG. 5A is a map 510 of Harmony Park. Roads 512, 514, 516, and 518 form a polygon 520 around Harmony Park. In this example, the area within the polygon has been replaced, or overlaid with an overlay value of 100%, with satellite imagery corresponding to the area of Harmony park. Again in this example, areas outside of the polygon, such as areas of polygon 522 and polygon 524, are not replaced or shown as overlaid with satellite imagery.

Before a polygon is replaced, the polygon must first be identified or selected. For example, each map may actually include a plurality of polygons. In order to map the map appear more interesting to a user, as noted above, only a small number of polygons (such as 1, 2, 3, etc.) may be overlaid with additional imagery. Thus, a computing device, such as server computing devices 110 or client computing devices 120, 130, or 140 may identify one or more particular polygons.

The polygons to be replaced may be identified in various ways. In one example, the polygons may be identified based on feature types associated with the polygons. In this example, the vectors used to render one or more polygons of the map may be associated with tags or labels identifying types of features. These tags or labels may then be used to identify polygons or areas to be replaced with additional imagery. As an example, when the map has reached the visual threshold, the client computing device may identify any tags associated with a polygon (or vectors that form the bounds of that polygon) within the displayed map. The client device may then compare the type of any identified tag with a list of tag types that can be overlaid or replaced with additional imagery. If the tag type is included in the list, the client device may overlay the area with additional imagery.

This list of tag types may include areas which are preapproved for replacement with satellite imagery. In this regard, all polygons or vectors that represent polygons which are tagged as parks or public areas may be automatically replaced, overlaid, etc. with additional imagery by the client device once the displayed map meets the visual threshold.

As another alternative, rather than comparing tag types to a list of preapproved tag types, the tags may simply identify specific polygons that are to be replaced with when a map is displayed such that the map meets the visual threshold. Thus, any polygon (or vectors which make up a polygon) associated with such a tag may be replaced or overlaid with additional imagery when the map has met the visual threshold.

Figure 5B:
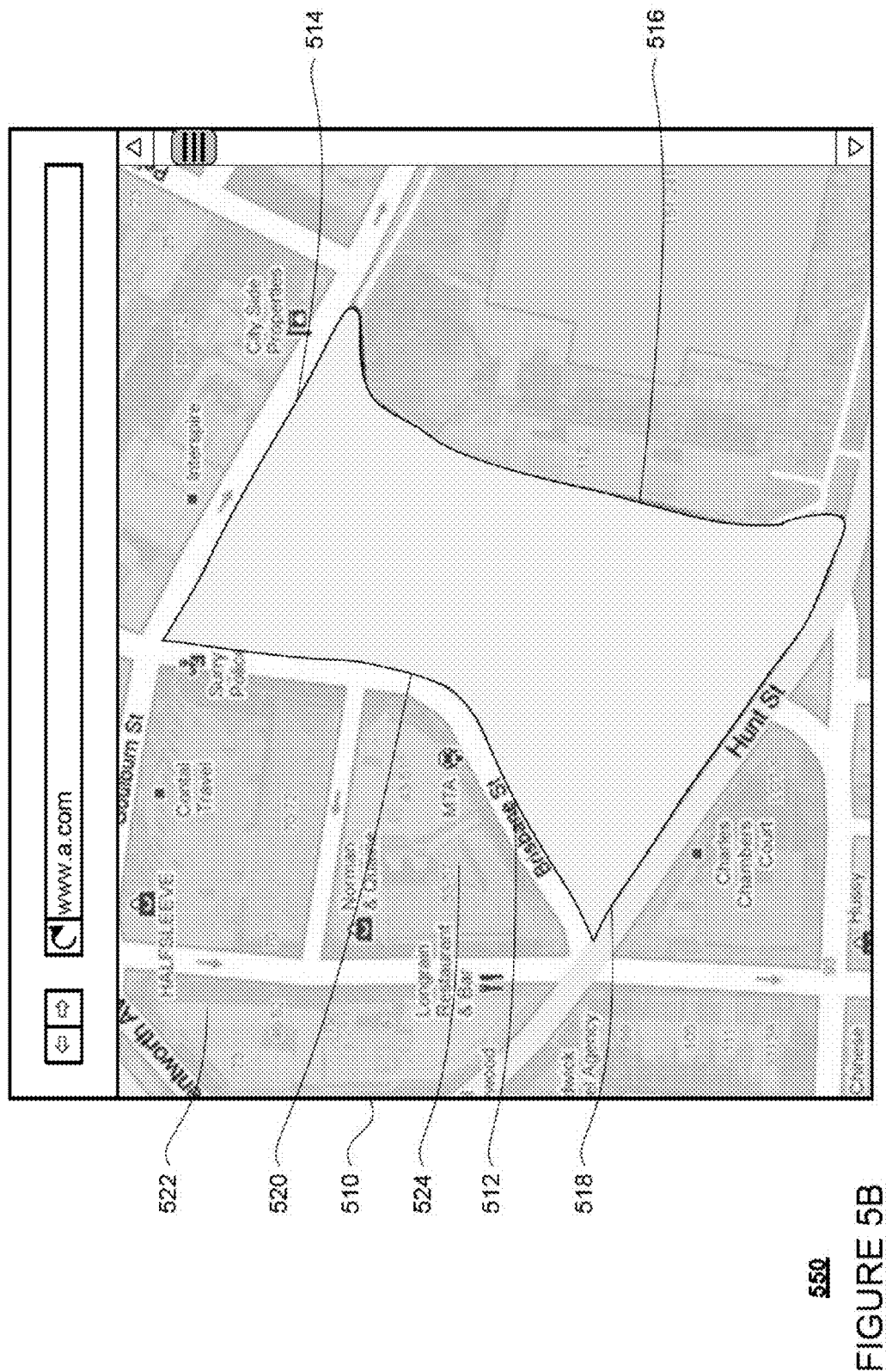

Screen shots 500 and 550 of FIGS. 5A and 5B may be used to demonstrate this tag feature. In screen shot 550 of FIG. 5B, the polygon 520 includes only map information. In this example, the vectors which make up the bounds Harmony Park may each be associated with a tag identifying the polygon and/or vectors as a public park. Once a map that includes polygon 520 or the vectors which make up this polygon is to be rendered such that the map meets the visual threshold, as shown in FIG. 5B, that polygon may be replaced or overlaid with a satellite image corresponding to the location of that polygon, here an image of Harmony Park as shown in FIG. 5A.

In another example, the polygons may be identified based on a user action. For instance, a user may select the polygon. This selection may be achieved by using a mouse pointer to click on the polygon or the area within the polygon. If the display includes a touch screen, this selection may be achieved by tapping with a finger or doing so with a stylus. When the visual threshold has been reached, this selection action may cause the client device to overlay the additional imagery on the area of the selected polygon. For example, a user may select polygon 520 in screen shot 550 of FIG. 5B. In response, the client device may overlay the satellite image of Harmony Park on the area within polygon 520 as shown in screen shot 500 of FIG. 5A.

The user action features may also be combined with the tag features described above. In this regard, a user may only select a polygon and receive additional imagery according to a tag associated with that polygon. For example, a user may select polygon 520 as shown in screen shot 550 of FIG. 5B. The client device may then identify any tag associated with polygon 520. If the tag or tag type indicates that the polygon is to be overlaid or replaced with additional imagery, the client device may automatically replace the polygon with satellite imagery as shown in screen shot 500 of FIG. 5A.

Similarly, selecting an area not associated with a tag or a tag type which indicates that the polygon is to be overlaid or replaced with additional imagery, such as if the tag type indicates the polygon is a non-public area, the client device may not provide the user with any additional imagery. Thus, if a user were to select polygon 524 in either screen shot 500 and 550 of FIG. 5A or 5B, which may not include a tag or tag type which is to be overlaid or replaced with additional imagery, the client device may not overlay polygon 524 with satellite imagery as shown in either screen shot 500 and 550 of FIGS. 5A and 5B.

In yet another example, a polygon may be identified based on a threshold associated with a polygon's characteristics relative to the displayed map. For example, if a polygon occupies more than a threshold number of pixels or threshold portion of a displayed map additional imagery may be displayed. In other words, if the polygon is relatively large enough and does not contain any other map features, the polygon may be replaced or overlaid with additional imagery.

In this regard, the visual threshold may relate to the characteristics to the polygon. Alternatively, the polygon threshold may be a different threshold from the visual threshold, such that the visual threshold must be met before the polygon threshold can be used to replace or overlay a polygon.

Again, these polygon threshold examples may be combined with one or both of the tag and user selection features above. As a first example, the client device may be required to determine that a visual threshold is met, a polygon has been selected by the user, and a polygon has met the polygon threshold (if different from the visual threshold), before replacing or overlaying the selected polygon with additional imagery. As a second example, the client device may be required to determine that a visual threshold is met, a polygon has met the polygon threshold (if different from the visual threshold), and a tag or tag type associated with the selected polygon indicates that the polygon is to be replaced or overlaid, before replacing or overlaying the selected polygon with additional imagery. As a third example, the client device may be required to determine that a visual threshold is met, a polygon has been selected by the user, the polygon has met the polygon threshold (if different from the visual threshold), and a tag or tag type associated with the selected polygon indicates that the polygon is to be replaced or overlaid, before replacing or overlaying the selected polygon with additional imagery.

Figure 6:
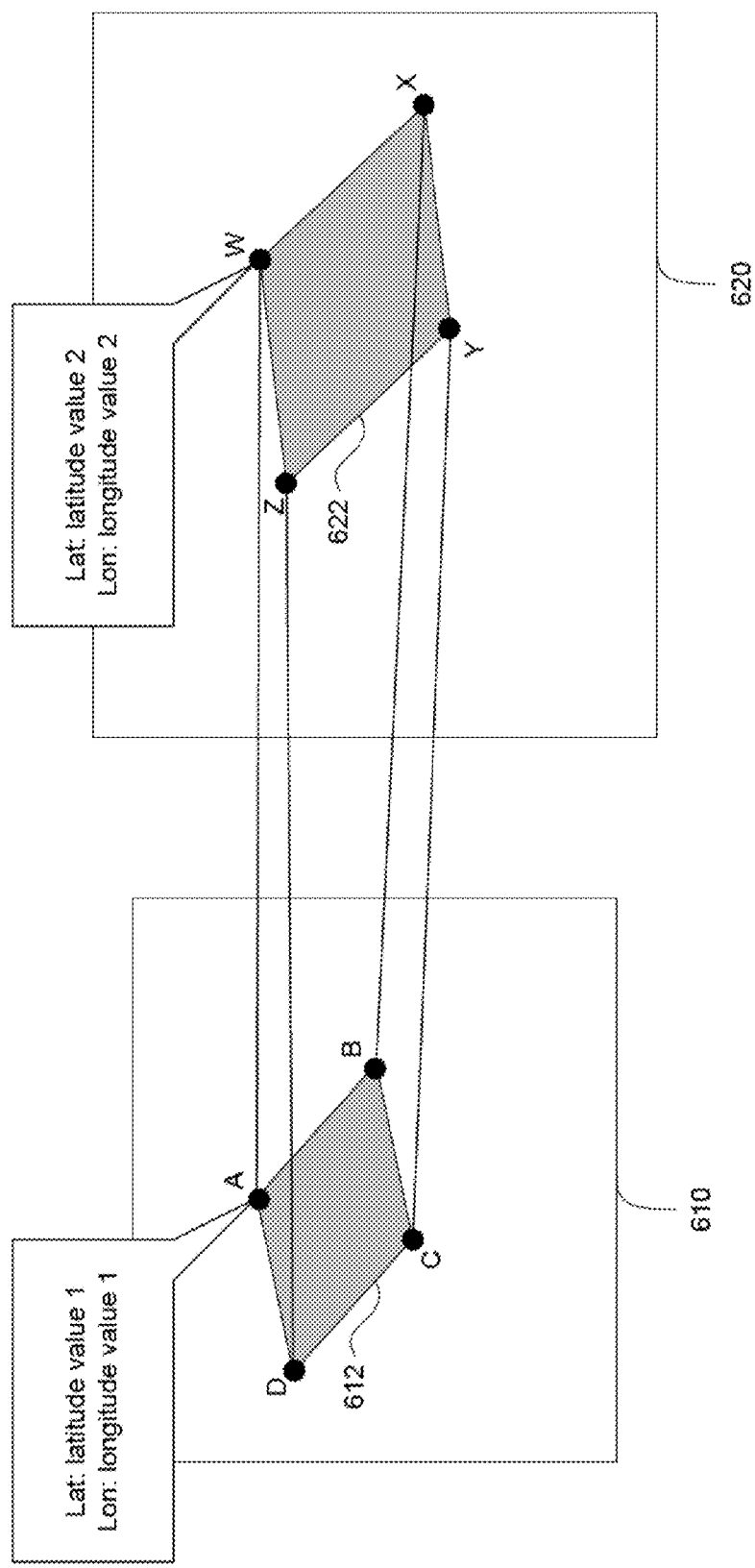
FIG. 6 is an example diagram of comparing map and imagery data in accordance with aspects of the disclosure.

The additional imagery may be selected to replace or overlay a polygon based on the geographic location of the polygon. For example, because both the map information and the additional imagery of storage system 150 are geolocated, the map location of the polygon may be used to identify a corresponding area of additional imagery. For example, as shown in FIG. 6, a map 610 may include a polygon 612 which is bounded by vertices A, B, C, and D. Each vertex may be associated with geographic location information, here latitude and longitude coordinates. Additional imagery 620 corresponds to approximately the same geographic area as map 610. In this regard, the geographic locations of vertices A, B, C, and D may be used to identify corresponding points W, X, Y, and Z in additional imagery 620. In this regard, the corresponding points may be used to draw a polygon 622. Polygon 612 may be overlaid or replaced by polygon 622 by matching up the corresponding vertices and points of map 610 and additional imagery 620, respectively. In addition, the zoom level of the displayed map as well as the area (size) of the polygon, here polygon 612, may also be used to determine the proper size of the additional imagery for display.

Figure 7:
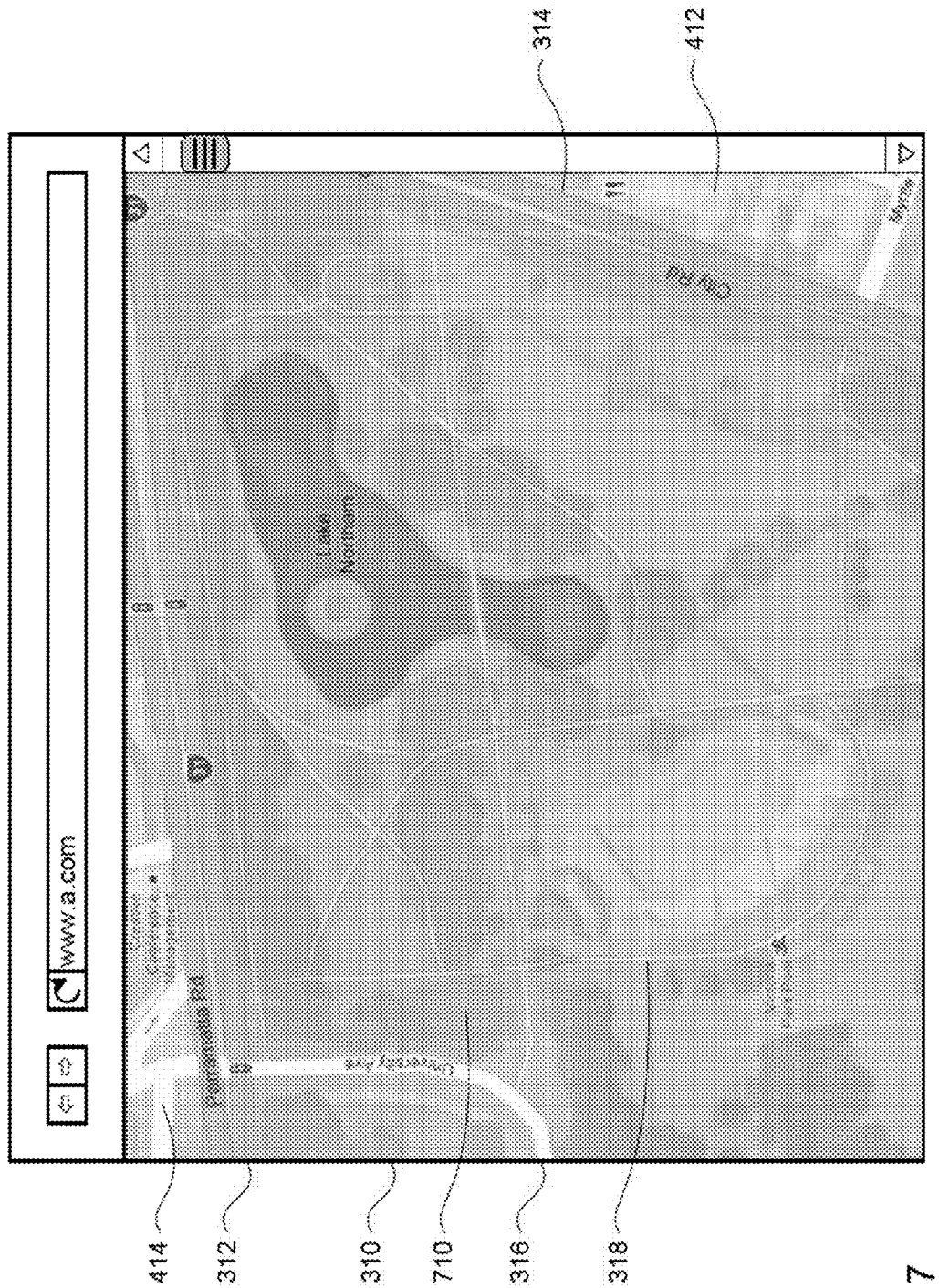
FIG. 7 is another example screen shot in accordance with aspects of the disclosure.
Figure 8:
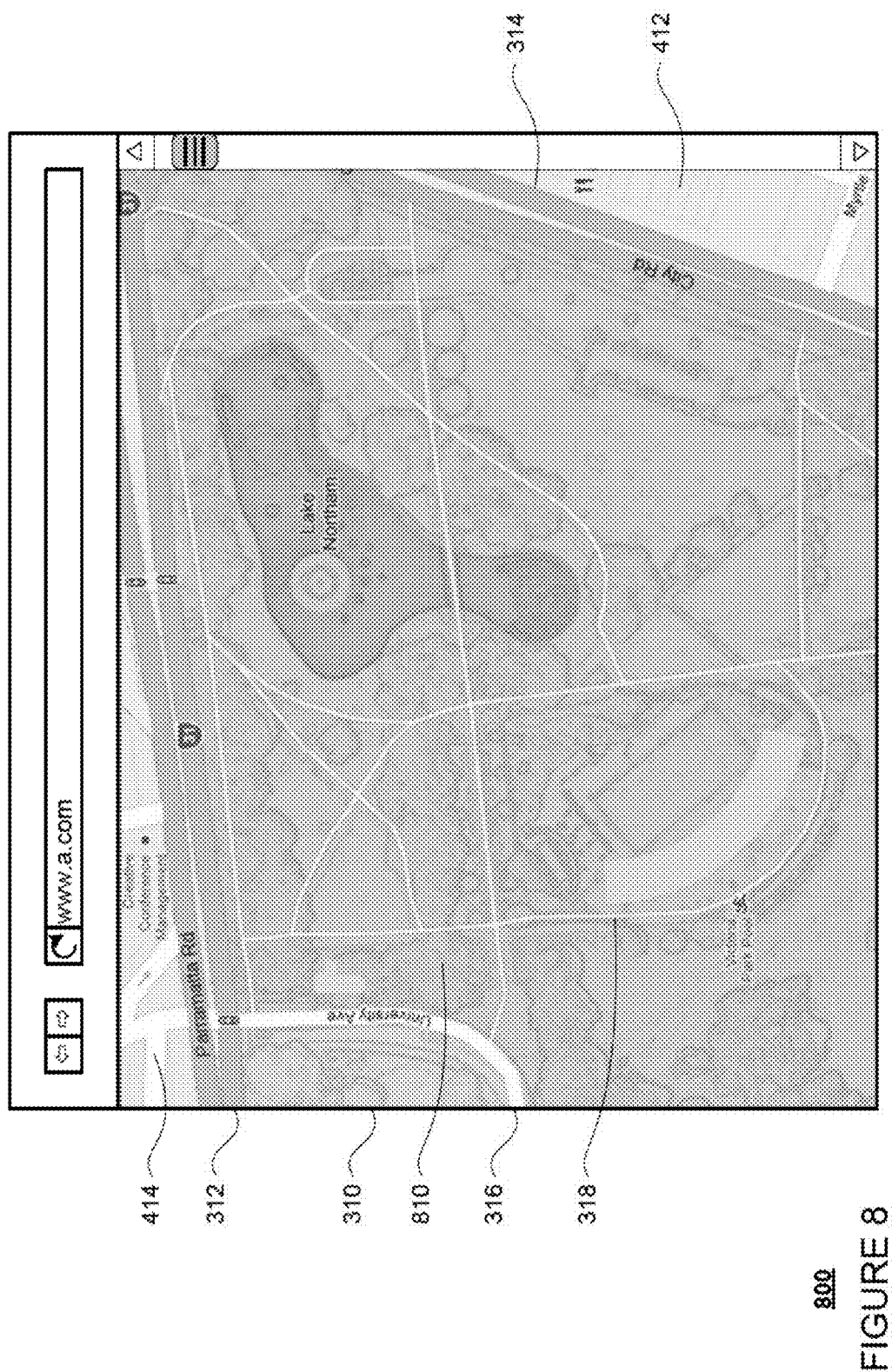
FIG. 8 is another example screen shot in accordance with aspects of the disclosure.

The additional imagery may be displayed in various ways. As noted above, it may simply replace, overlaid, etc. on the map. In addition, the additional imagery may be given various effects to improve the user's map viewing experience. For example, the effects may include a straightforward blend or overlay as with satellite imagery 410 of FIG. 4, a dry brush effect as with satellite imagery 710 FIG. 7, or a fine edge blend as with satellite imagery 810 FIG. 8. This fine edge blend may give the map a cartoonish style, such that the user has the impression that the satellite imagery was "drawn" as part of the map.

The replacing or overlaying may be may occur at a location remote from the client device, such as a server that provides the map information to the client device. In this regard, if there is a user action, this information may be sent to the server which may provide appropriate map information and additional imagery to the client device in response.

Alternatively, the replacing or overlaying may be performed locally at the user's client device. In this regard, the additional imagery may be stored locally at the client device with the map or received by the client device from a server computing device. For example, in response to determining that rendering a map will meet a visual threshold, the client device may request any additional imagery from a server computing device. Similarly, the client device may request the additional imagery in response to a user selection action, the client device determining that a polygon threshold has been met, etc. Alternatively, when the client device initially receives the map, any relevant additional imagery may be sent with the map automatically, and only rendered when necessary as described in the various examples above. In addition, the selection of the additional imagery, shown in FIG. 6, may be done at the client device or by one or more server computing devices and sent to the client device afterwards.

Figure 9:
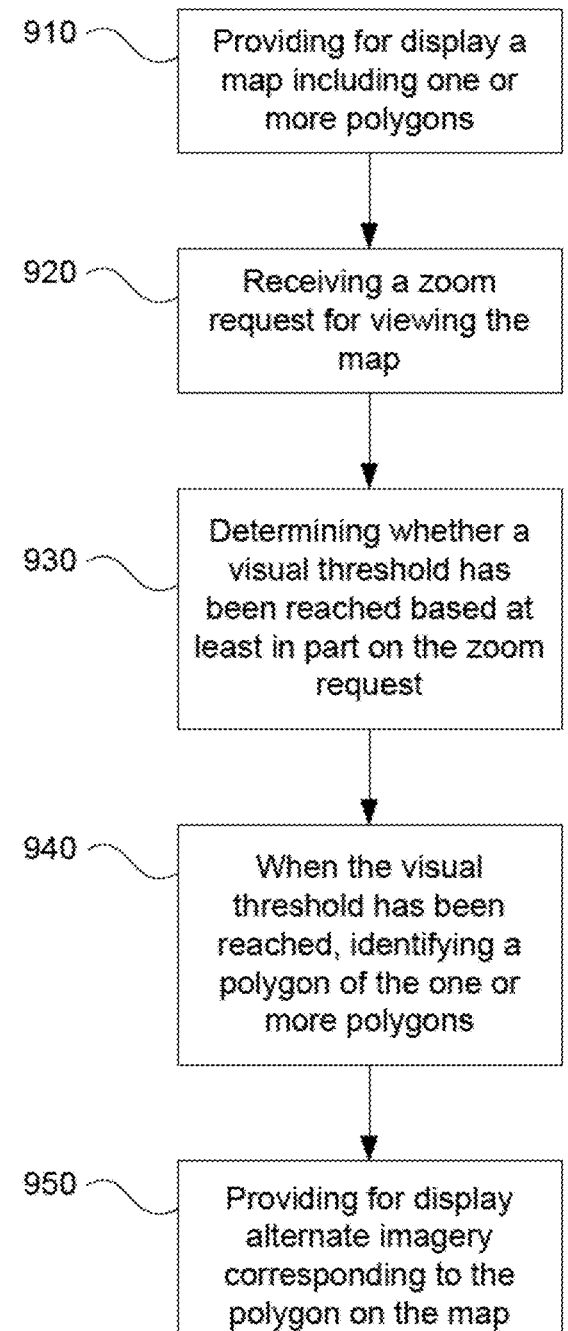
FIG. 9 is a flow diagram in accordance with aspects of the disclosure.

Flow diagram 900 of FIG. 9 is an example of steps that may be performed by one or more computing devices, such as server computing devices 110 and/or client computing devices 120, 130, and 140, in accordance with aspects of the technology described herein. A map including one or more polygons is provided for display at block 910. A zoom request for viewing the map is received at block 920. Whether a visual threshold of the map has been reached is determined based at least in part on the zoom request at block 930. When the visual threshold has been reached, a polygon of the one or more polygons is identified at block 940. Alternate imagery corresponding to the polygon on the map is then provided for display at block 950.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for blending map data with additional imagery comprising:

providing for display, by one or more computing devices, a map including one or more polygons on the map, wherein each polygon of the one or more polygons includes a set of polygon sides corresponding to a set of roads in the map;

receiving, by the one or more computing devices, a zoom request for zooming in on the map;

determining, by the one or more computing devices, whether a map zoom threshold has been reached based at least in part on the zoom request;

after the map zoom threshold has been reached, receiving user input, by the one or more computing devices, selecting a given polygon of the one or more polygons, the polygon being associated with a tag having a tag type indicating a type of geographic feature bounded by the set of roads of the given polygon on the map;

comparing the tag type to a list of tag types that are preapproved for replacement with alternate imagery to determine whether the tag type is included in the list of tag types; and when the tag type is included in the list of tag types, providing for display at the given polygon on the map, by the one or more computing devices, alternate imagery corresponding to an image of the geographic area bounded by the set of roads for the given polygon on the map in order to overlay the given polygon on the map with the image, wherein providing the alternative imagery further includes providing instructions to display the alternative imagery at a fixed percentage overlay value, such that a portion of the map within the given polygon is visible through the alternative imagery.

2. The method of claim 1, wherein identifying the given polygon is based at least in part on a user selection action made after the map zoom threshold has been reached.

3. The method of claim 1, wherein identifying the given polygon is based at least in part on a number of pixels associated with the polygon.

4. The method of claim 1, wherein the alternate imagery includes a satellite image or an aerial image.

5. The method of claim 1, further comprising, identifying the alternate imagery by comparing the geographic locations of the vertices of the polygon to geographic location information associated with the alternate imagery.

6. The method of claim 1, wherein displaying the alternate imagery further includes giving the alternate imagery a fine edge effect.

7. The method of claim 1, wherein displaying the alternate imagery further includes giving the alternate imagery a dry brush effect.

8. A method comprising:

receiving, by one or more computing devices, a request for a map, wherein each polygon of the one or more polygons includes a set of polygon sides corresponding to a set of roads in the map;

providing for display, by the one or more computing devices, the map including one or more polygons on the map;

receiving, by the one or more computing devices, a request to zoom in on the map;

determining, by the one or more computing devices, whether a visual threshold of the map has been reached based at least in part on the request to zoom in on the map;

after the visual threshold of the map has been reached, receiving user input, by the one or more computing devices, selecting a given polygon of the one or more polygons, the polygon being associated with a tag having a tag type indicating a type of geographic feature bounded by the set of roads of the given polygon on the map; and comparing the tag type of a list of tag types that are preapproved for replacement with alternative imagery to determine whether the tag type is included in the list of tag types; and when the tag type is included in the list of tag types, providing for display at the given polygon on the map, by the one or more computing devices, alternate imagery corresponding to an image of the geographic area bounded by the set of roads for the given polygon on the map in order to overlay the given polygon on the map with the image, wherein providing the alternative imagery further includes providing instructions to display the alternative imagery at a fixed percentage overlay value, such that a portion of the map within the given polygon is visible through the alternative imagery.

9. The method of claim 8, wherein the visual threshold is a minimum number of vectors rendered in the map.

10. The method of claim 8, wherein the visual threshold is a particular zoom level of the map.

11. The method of claim 8, wherein identifying the given polygon is based at least in part on a threshold of the given polygon's characteristics relative to the displayed map.

12. The method of claim 11, wherein identifying the given polygon is further based on a user selection action identifying the given polygon.

13. The method of claim 11, wherein identifying the given polygon is further based on map information describing a feature type associated with the given polygon.

14. A system comprising one or more computing devices, each of the one or more computing devices having one or more processors, the one or more computing devices being configured to:

receive a request for a map;

provide for display the map including one or more polygons on the map, wherein each polygon of the one or more polygons includes a set of polygon sides corresponding to a set of roads in the map;

receive a request to zoom in on the map;

determine whether a visual threshold of the map has been reached based at least in part on the request to zoom in on the map;

when after the visual threshold of the map has been reached, receiving user input selecting a given polygon of the one or more polygons on the map, the polygon being associated with a tag type indicating a type of geographic feature bounded by the set of roads of the given polygon on the map;

comparing the tag type to a list of tag types that are preapproved for replacement with alternate imagery to determine whether the tag type is included in the list of tag types; and when the tag type is included in the list of tag types, provide for display at the given polygon on the map, alternate imagery corresponding to an image of the geographic area bounded by the set of roads for the given polygon on the map in order to overlay the given polygon on the map with the image and instructions to display the alternative imagery at a fixed percentage overlay value, such that a portion of the map within the given polygon is visible through the alternative imagery.

15. The system of claim 14, wherein the one or more computing devices are further configured to identify the given polygon based at least in part on a threshold of the given polygon's characteristics relative to the displayed map.

16. The system of claim 14, wherein the one or more computing devices are further configured to identify the given polygon further based on a user selection action identifying the given polygon.

17. The system of claim 14, wherein the one or more computing devices are further configured to identify the given polygon further based on map information describing a feature type associated with the given polygon.

18. The method of claim 1, wherein the map is a two-dimensional map including a plurality of vectors which make up the one or more polygons.

19. The method of claim 1, further comprising, after the map zoom threshold has been reached, receiving second user input, by the one or more computing devices, selecting a second polygon of the one or more polygons, the polygon being associated with a second tag having a second tag type that indicates that the second polygon is not preapproved for replacement with alternate imagery.

* * * * *